(12) United States Patent
Yamaoka

(10) Patent No.: US 8,973,457 B2
(45) Date of Patent: Mar. 10, 2015

(54) GEAR MECHANISM AND GEARED MOTOR

(75) Inventor: Mamoru Yamaoka, Nagano (JP)

(73) Assignee: Nidec Sankyo Corporation (JP)

( * ) Notice: Subject to any disclaimer, the term of this patent is extended or adjusted under 35 U.S.C. 154(b) by 282 days.

(21) Appl. No.: 13/584,946

(22) Filed: Aug. 14, 2012

(65) Prior Publication Data

US 2013/0047764 A1 Feb. 28, 2013

(30) Foreign Application Priority Data

Aug. 22, 2011 (JP) ................. 2011-180857

(51) Int. Cl.
| | | |
|---|---|---|
| *H02K 7/116* | (2006.01) | |
| *F16H 55/17* | (2006.01) | |
| *F16H 19/00* | (2006.01) | |
| *F16H 35/00* | (2006.01) | |

(52) U.S. Cl.
CPC .............. *F16H 19/001* (2013.01); *F16H 35/00* (2013.01); *H02K 7/116* (2013.01); *F16H 2035/006* (2013.01); *F16H 2019/008* (2013.01)
USPC .......................................... 74/437; 74/421 A

(58) Field of Classification Search
CPC ..... F16H 1/00; F16H 2019/008; F16H 27/08; F16H 19/001
USPC ....... 1/411.5, 412 R, 413, 421 A, 421 R, 435, 1/437
See application file for complete search history.

(56) References Cited

U.S. PATENT DOCUMENTS

| | | | | |
|---|---|---|---|---|
| 319,513 | A | * | 6/1885 | Schulze-Berge ................ 74/437 |
| 466,923 | A | * | 1/1892 | Price .............................. 74/437 |
| 3,332,303 | A | * | 7/1967 | Daugherty .................... 192/138 |
| 3,890,853 | A | * | 6/1975 | Feltz .............................. 74/435 |
| 6,137,962 | A | * | 10/2000 | Namai .......................... 396/401 |
| 2006/0191364 | A1 | * | 8/2006 | Linke et al. ..................... 74/411 |

FOREIGN PATENT DOCUMENTS

JP 2008-261401 A 10/2008

* cited by examiner

*Primary Examiner* — Justin Krause
(74) *Attorney, Agent, or Firm* — Cantor Colburn LLP

(57) ABSTRACT

A gear mechanism may include a first gear, a second gear engaged with the first gear, and a stopper part formed in the second gear. The stopper part may be engaged with the first gear to prevent turning of the first gear. The stopper part is a part where a tooth is not formed in an outer peripheral part of the second gear. The stopper part includes a protruded part protruded to an outer side in a radial direction with respect to a tooth tip circle of a tooth part of the second gear, and a recessed part recessed to an inner side in the radial direction with respect to the protruded part and adjacent to the protruded part in a circumferential direction and, when turning of the first gear is stopped, a tip end side of the tooth part of the first gear is abutted with the recessed part.

15 Claims, 8 Drawing Sheets

GEAR MECHANISM AND GEARED MOTOR

CROSS REFERENCE TO RELATED APPLICATION

The present invention claims priority under 35 U.S.C. §119 to Japanese Application No. 2011-180857 filed Aug. 22, 2011, the entire content of which is incorporated herein by reference.

FIELD OF THE INVENTION

At least an embodiment of the present invention may relate to a gear mechanism and a geared motor in which a force is transmitted through a plurality of gears.

BACKGROUND

In a gear mechanism structured in a geared motor or the like, engagement of gears with each other is sometimes utilized as a stopper mechanism for restricting a range of a turning angle of a gear. Specifically, in a gear mechanism having a first gear and a second gear engaged with the first gear, for example, a structure has been proposed in which a valley part between tooth parts in the second gear is filled up and used as a stopper part (see, Japanese Patent Laid-Open No. 2008-261401).

According to this structure, when a tooth tip part of a tooth part of the first gear is abutted with the stopper part of the second gear, the first gear is unable to turn further more and thus turning of the first gear is stopped.

However, in the structure described in the above-mentioned Patent Literature, when turning of the first gear is stopped by the stopper part provided in the second gear, a turning force of the first gear is concentrated on the tooth tip part of the first gear and thus damage such as breaking, deformation and a crack may be easily occurred in the tooth part.

SUMMARY

In view of the problem described above, at least an embodiment of the present invention may advantageously provide a gear mechanism and a geared motor in which damage of a tooth part is hard to be occurred even when a stopper mechanism is structured by utilizing engagement of gears with each other.

According to at least an embodiment of the present invention, there may be provided a gear mechanism including a first gear, a second gear which is engaged with the first gear, and a stopper part which is formed in the second gear, and the stopper part is engaged with a tooth part of the first gear to prevent turning of the first gear. The stopper part is a teeth non-formation part where a tooth part is not formed in an outer peripheral part of the second gear, and the stopper part includes a protruded part which is protruded to an outer side in a radial direction with respect to a tooth tip circle of a tooth part of the second gear, and a recessed part which is recessed to an inner side in the radial direction with respect to the protruded part at a position adjacent to the protruded part in a circumferential direction and, when turning of the first gear is stopped, a tip end side of the tooth part of the first gear is abutted with the recessed part.

In accordance with at least an embodiment of the present invention, in order to structure a stopper mechanism by utilizing engagement of the first gear with the second gear, the second gear is formed with a stopper part provided with a teeth non-formation part where a tooth part is not formed and the stopper part includes a protruded part which is protruded to an outer side in a radial direction with respect to a tooth tip circle of a tooth part of the second gear, and a recessed part which is recessed to an inner side in the radial direction with respect to the protruded part at a position adjacent to the protruded part in a circumferential direction and, when turning of the first gear is stopped, a tip end side of the tooth part of the first gear is abutted with the recessed part. Therefore, it may be structured that, when turning of the first gear is stopped by the stopper part, the first gear is stopped by both of the protruded part and the recessed part abutting with the tooth part of the first gear. As a result, when the tooth part of the first gear is abutted with the recessed part, the protruded part of the stopper part is also abutted with the vicinity of a pitch circle of the tooth part of the first gear. Therefore, even when turning of the first gear is stopped by the stopper part provided in the second gear, a turning force of the first gear is not concentrated on the tooth tip part of the first gear and thus damage such as breaking, deformation, a crack and the like is hard to be occurred in the tooth part. In this case, it may be structured that the second gear is provided with a large diameter gear part and a small diameter gear part, an outer peripheral part of the large diameter gear part is formed with a teeth formation part where tooth parts are formed and a teeth non-formation part where a tooth part is not formed, and the stopper part is formed at both ends of the teeth non-formation part in a circumferential direction.

In accordance with at least an embodiment of the present invention, the recessed part is recessed to an inner side in the radial direction with respect to the tooth tip circle of the second gear. According to this structure, the protruded part is surely abutted with the vicinity of a pitch circle of the tooth part of the first gear before the tooth part of the first gear is abutted with the recessed part. Therefore, when turning of the first gear is stopped by the stopper part provided in the second gear, a turning force of the first gear is surely prevented from concentrating on the tooth tip part and thus damage of the tooth part is hard to be occurred. Specifically, it is preferable that the recessed part is formed with a shape which is capable of face-contacting with a tip end side of the tooth part of the first gear and, when turning of the first gear is stopped by the stopper part, a root part side of the tooth part of the first gear is stopped by the protruded part and the tip end side of the tooth part of the first gear is stopped by being face-contacted with the recessed part.

In accordance with at least an embodiment of the present invention, the recessed part is located on an outer side in the radial direction with respect to a pitch circle of the second gear. According to this structure, a state is prevented in which tooth parts adjacent to each other in the circumferential direction of the first gear engage and bite the protruded part from both sides to be in an unmoving state.

In accordance with at least an embodiment of the present invention, the recessed part is located on an outer side in the radial direction with respect to an imaginary circle having a diameter between a diameter of a tooth root circle of the second gear and a diameter of the tooth tip circle of the second gear and the imaginary circle is concentric with the tooth root circle of the second gear and the tooth tip circle of the second gear. According to this structure, a state is prevented in which tooth parts adjacent to each other in the circumferential direction of the first gear engage and bite the stopper part from both sides to be in an unmoving state.

The gear mechanism in accordance with at least an embodiment of the present invention may be applied, for example, to a geared motor in which rotation of a motor is decelerated and transmitted through the gear mechanism. In this case, it is preferable that the first gear is a motor pinion provided in a rotation shaft of the motor and the second gear is an input gear which is engaged with the motor pinion. According to this structure, the stopper part is provided in a portion where a torque is relatively small and thus a load applied to the tooth part is small. Accordingly, damage of the tooth part is hard to be occurred.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

An embodiment of a gear mechanism and a motor to which the present invention is applied will be described below with reference to the accompanying drawings.

(Entire Structure)

Figure 1A:
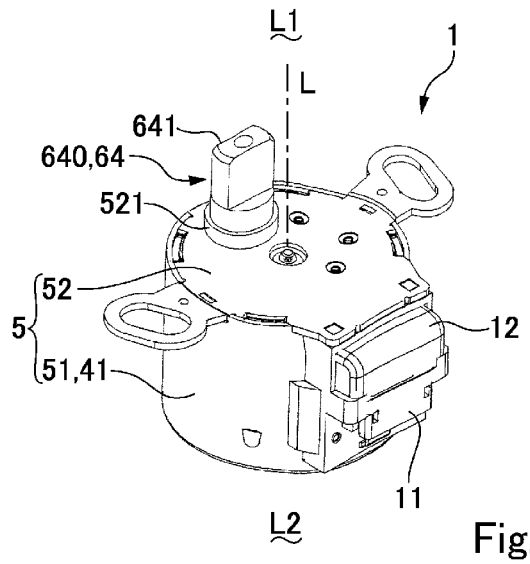
FIGS. 1(a), 1(b) and 1(c) are explanatory views showing an entire structure of a geared motor in accordance with an embodiment of the present invention.
Figure 1B:
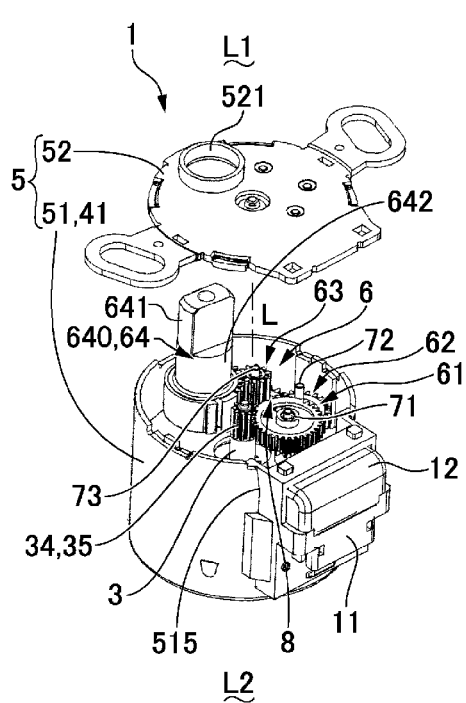
Figure 1C:
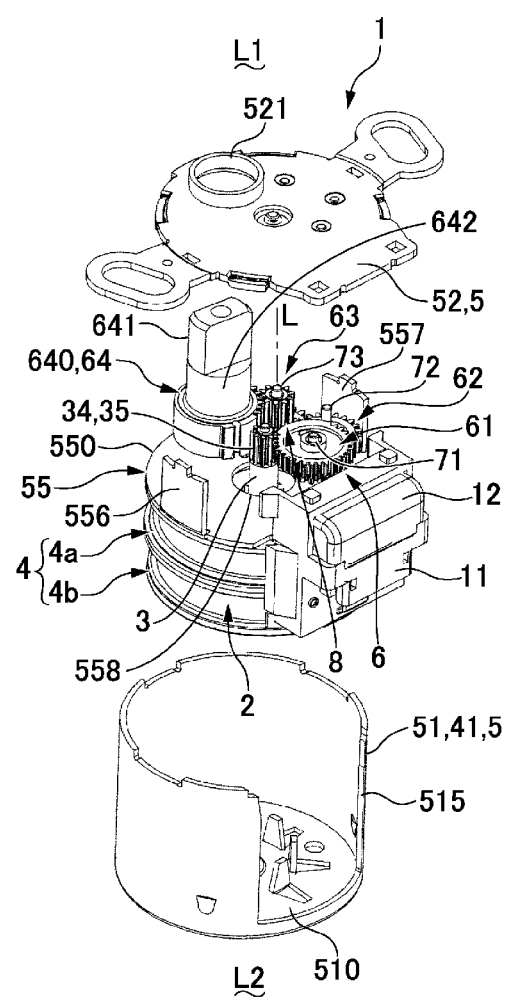
Figure 2:
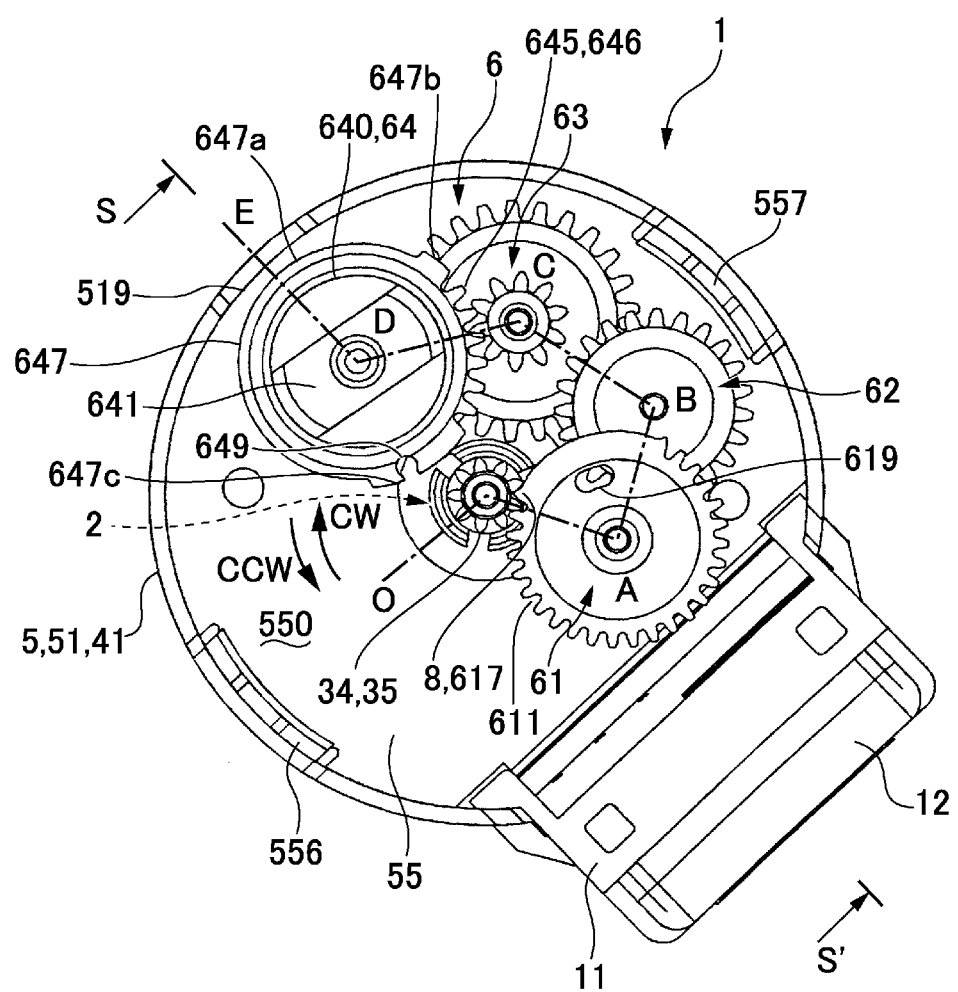
FIG. 2 is a plan view showing a geared motor in accordance with an embodiment of the present invention in which a cover is detached.
Figure 3A:
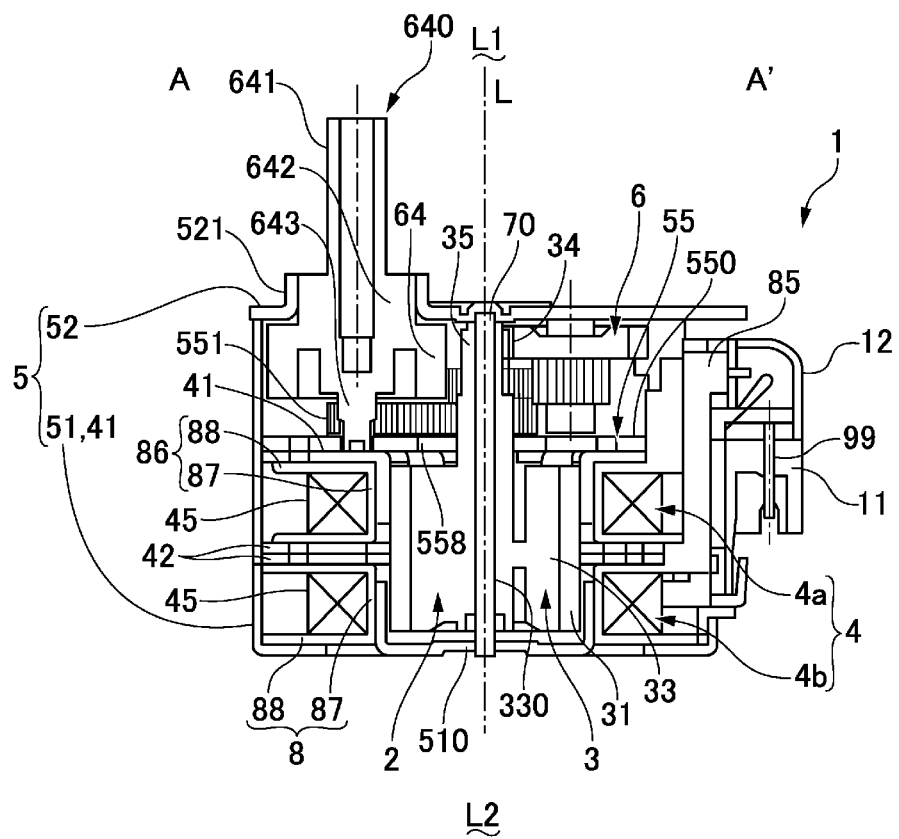
FIGS. 3(a) and 3(b) are explanatory cross-sectional views showing an internal structure of a geared motor in accordance with an embodiment of the present invention.
Figure 3B:
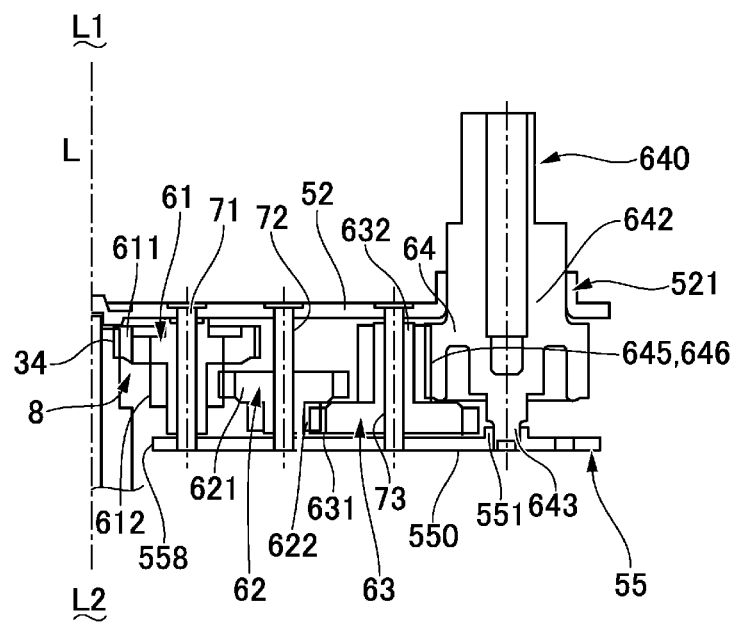

FIGS. 1(a), 1(b) and 1(c) are explanatory views showing an entire structure of a geared motor in accordance with an embodiment of the present invention. FIG. 1(a) is a perspective view showing a geared motor, FIG. 1(b) is an exploded perspective view showing a state in which a cover is detached from the geared motor, and FIG. 1(c) is an exploded perspective view showing a state in which a case is further detached. FIG. 2 is a plan view showing a geared motor in accordance with an embodiment of the present invention in which a cover is detached. FIGS. 3(a) and 3(b) are explanatory cross-sectional views showing an internal structure of a geared motor in accordance with an embodiment of the present invention. FIG. 3(a) is a cross-sectional view showing a geared motor which is cut at a position corresponding to the "S-S" line in FIG. 2, and FIG. 3(b) is a cross-sectional view showing a gear mechanism which is cut along the line "O-A-B-C-D-E" in FIG. 2.

In FIGS. 1(a), 1(b) and 1(c) and FIG. 2, a geared motor 1 to which the present invention is applied is substantially structured of a motor 2 having a stepping motor structure, a gear mechanism 6 comprised of a plurality of gears, and a housing 5 in which the motor 2 and the gear mechanism 6 are accommodated. The housing 5 includes a cup-shaped case 51 whose upper face is opened and a plate-shaped cover 52 which closes an opening of the case 51.

As shown in FIG. 3(a), the motor 2 is substantially structured of a stator 4 and a rotor 3. The stator 4 includes two stator assemblies 4a and 4b which are disposed so as to be superposed on each other in a motor axial direction "L". In each of the stator assemblies 4a and 4b, an outer stator core 41 and an inner stator core 42 are disposed so as to be faced each other in the motor axial direction "L". Each of the outer stator core 41 and the inner stator core 42 is provided with a flange part formed in a circular ring shape and pole teeth which are bent from an inner circumferential edge of the flange part in the motor axial direction "L". In a state that the outer stator core 41 and the inner stator core 42 are disposed in the motor axial direction "L", the pole teeth of the outer stator core 41 and the pole teeth of the inner stator core 42 are alternately arranged in the circumferential direction.

The rotor 3 is coaxially disposed with the stator 4 on an inner side of the stator 4. The rotor 3 includes a rotor main body 33 provided with a shaft hole 330 and a permanent magnet 31 which is fixed to an outer peripheral face of the rotor main body 33. An outer peripheral face of the permanent magnet 31 faces the pole teeth. The rotor 3 is rotatably supported by a support shaft 70 which is fitted to the shaft hole 330. The support shaft 70 is a fixed shaft whose both ends are supported by a bottom part 510 of the case 51 and the cover 52. An end part on a cover 52 side of the rotor main body 33 is formed as a rotation shaft 35 whose outer peripheral face is provided with a motor pinion 34. In the motor 2 structured as described above, an outer stator core 41 of the stator assembly 4b which is disposed on an opposite side to an output side "L1" where the rotation shaft 35 is protruded (opposite-to-output side "L2") is formed as a part of the case 51.

In each of two stator assemblies 4a and 4b, the outer stator core 41 and the inner stator core 42 are respectively superposed on a pair of flange parts 88 formed in the coil bobbin 86. The flange part 88 is connected with a cylindrical tube part 87 which surrounds the pole teeth and a coil 45 is wound around in a region formed by the cylindrical tube part 87 and the flange parts 88. The coil bobbin 86 is provided with a terminal holding part 85 having a larger wall thickness at a portion located on an outer side in a radial direction with respect to an end face on an output side "L1" of the stator 4. The terminal holding part 85 is protruded to an outer side in the radial direction through a cut-out portion 515 (see FIG. 1(c)) formed in a side face part of the case 51. The terminal holding part 85 holds a plurality of motor side terminals 99. An outside in the radial direction of the terminal holding part 85 is covered by a terminal cover 11 and an outside cover 12.

(Schematic Structure of Gear Mechanism 6)

Figure 4A:
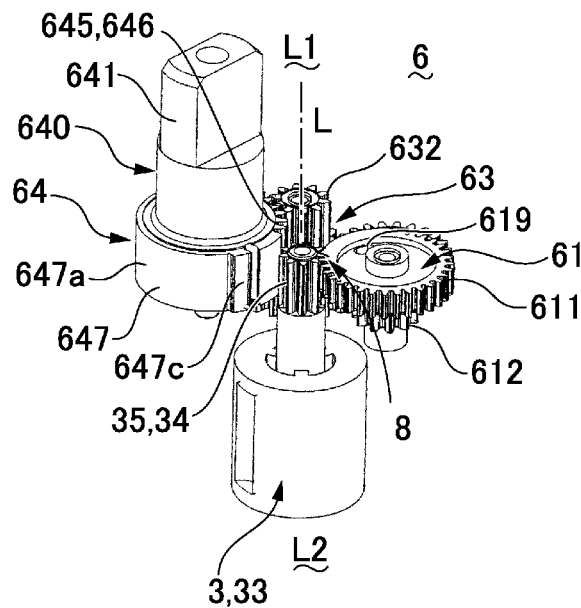
FIGS. 4(a) and 4(b) are explanatory perspective views showing a gear mechanism of a geared motor in accordance with an embodiment of the present invention.
Figure 4B:
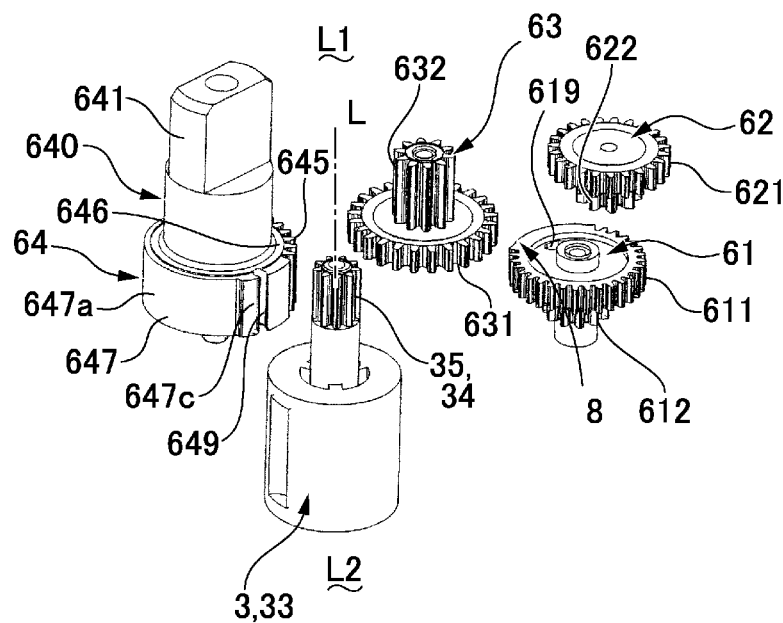

FIGS. 4(a) and 4(b) are explanatory perspective views showing the gear mechanism 6 of the geared motor 1 in accordance with an embodiment of the present invention. FIG. 4(a) is a perspective view sowing the gear mechanism 6 and FIG. 4(b) is its exploded perspective view.

As shown in FIG. 2 and FIG. 3(b) and FIGS. 4(a) and 4(b), the geared motor 1 in this embodiment includes the gear mechanism 6 comprised of a plurality of gears including the motor pinion 34. Rotation of the rotor 3 of the motor 2 is outputted to the outside through the gear mechanism 6. In this embodiment, the gear mechanism 6 includes totaled four gears 61, 62, 63 and 64 in addition to the motor pinion 34, and the gear 64 of the last stage is structured as an output member 640 provided with an output shaft 641. The output shaft 641 of the output member 640 is a plate-shaped part having a shape in which a round bar portion is cut out so as to form two parallel faces. Therefore, a shape of the output shaft 641 is not formed in a round shape in a circumferential direction and a directionality in the circumferential direction is required when a driven member (not shown) is to be connected with the output shaft 641.

Three gears 61, 62 and 63 except the gear 64 of the last stage are respectively rotatably supported by support shafts 71, 72 and 73 (see FIG. 3(b)) whose both ends are supported by an intermediate plate 55 fixed to the case 51 and the cover 52. The gear 64 of the last stage is rotatably supported so that its shaft parts 642 and 643 are rotatably supported by a bearing part 521 of the cover 52 and a bearing part 551 of the intermediate plate 55. In this embodiment, the intermediate plate 55 is provided with a flat plate part 550 and a pair of connecting plates 556 and 557 which are stood up toward an output side "L1" from positions opposite to each other of the flat plate part 550. The connecting plates 556 and 557 are fixed to an inner face of the case 51. Further, a center of the flat plate part 550 of the intermediate plate 55 is formed with a center hole 558 through which the support shaft 70, the rotation shaft 35 of the rotor 3 and the like are penetrated. In this embodiment, the gears 61, 62 and 63 are a gear made of resin such as polyacetal, polybutylene terephthalate or polyamide.

In this embodiment, when viewed from the motor pinion 34 side, a large diameter gear part 611 of a first gear 61 is engaged with the motor pinion 34 which is formed on an outer peripheral side of the output side "L1" of the rotation shaft 35. A small diameter gear part 612 of the gear 61 is engaged with a large diameter gear part 621 of a second gear 62. A small diameter gear part 622 of the gear 62 is engaged with a large diameter gear part 631 of a third gear 63 and a small diameter gear part 632 of the gear 63 is engaged with tooth parts 645 of the gear 64 of the last stage. The gear mechanism 6 is structured as a speed reducing gear train as described above. In this embodiment, four gears 61, 62, 63 and 64 are disposed around the motor pinion 34.

In the geared motor 1 structured as described above, when an electrical power is supplied to the stator 4 of the motor 2 and thereby the rotor 3 is rotated, the rotation is transmitted to the output member 640 (gear 64) through the motor pinion 34, the gear 61, the gear 62 and the gear 63 to turn the output shaft 641. In this embodiment, the rotor 3 is capable of rotating in a clockwise direction "CW" and in a counterclockwise direction "CCW" and the output member 640 (gear 64) is reciprocatedly turned over a predetermined angular range according to the rotation of the rotor 3. In this embodiment, the output shaft 641 of the output member 640 is a plate-shaped part having a shape in which a round bar portion is cut out so as to form two parallel faces. Therefore, when a driven member (not shown) is connected with the output shaft 641 in a predetermined direction by utilizing a directionality of the output shaft 641, an attitude of the driven member can be changed by utilizing rotation of the motor 2. In this case, a turning range in the clockwise direction "CW" and a turning range in the counterclockwise direction "CCW" of the output member 640 are restricted by a stopper mechanism which is structured between the motor pinion 34 and the gear 61 as described below with reference to FIGS. 5(a) and 5(b) and FIGS. 6(a) and 6(b). Therefore, a range in which an attitude or the like of the driven member is changed is restricted by the stopper mechanism.

(Structure of Stopper Mechanism between Motor Pinion 34 and Gear 61)

Figure 5A:
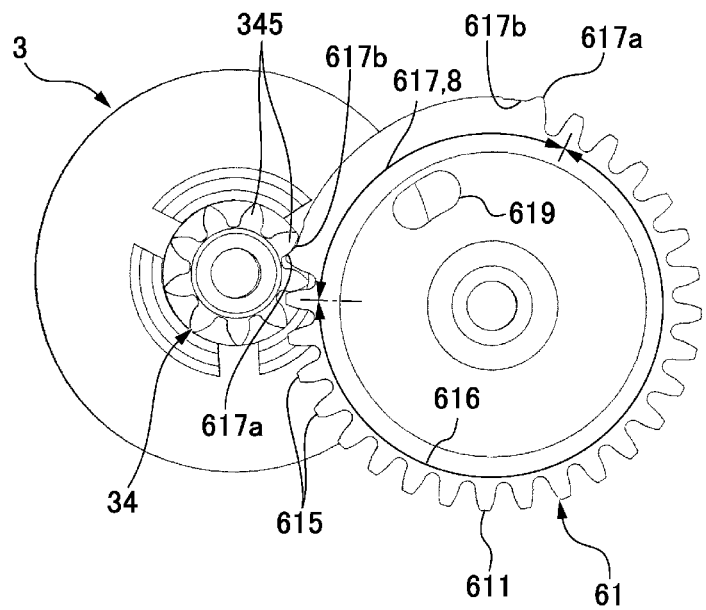
FIGS. 5(a) and 5(b) are explanatory views showing an engaging portion of a motor pinion with a gear in a geared motor in accordance with an embodiment of the present invention.
Figure 5B:
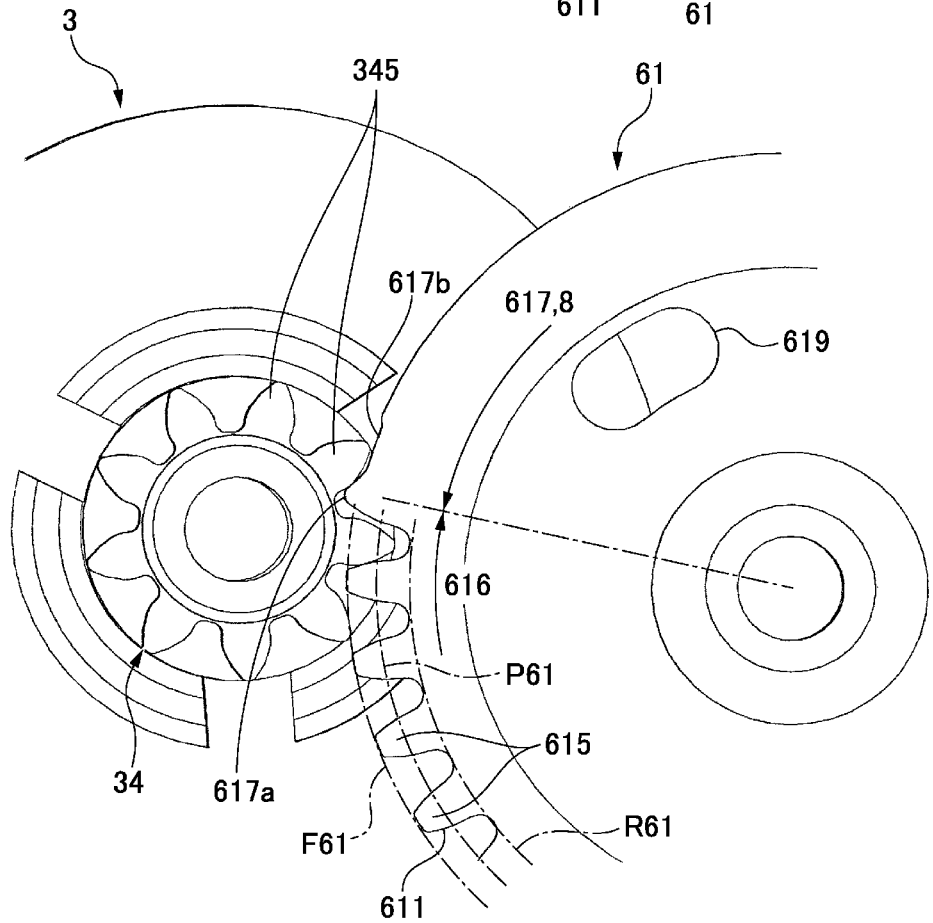
Figure 6A:
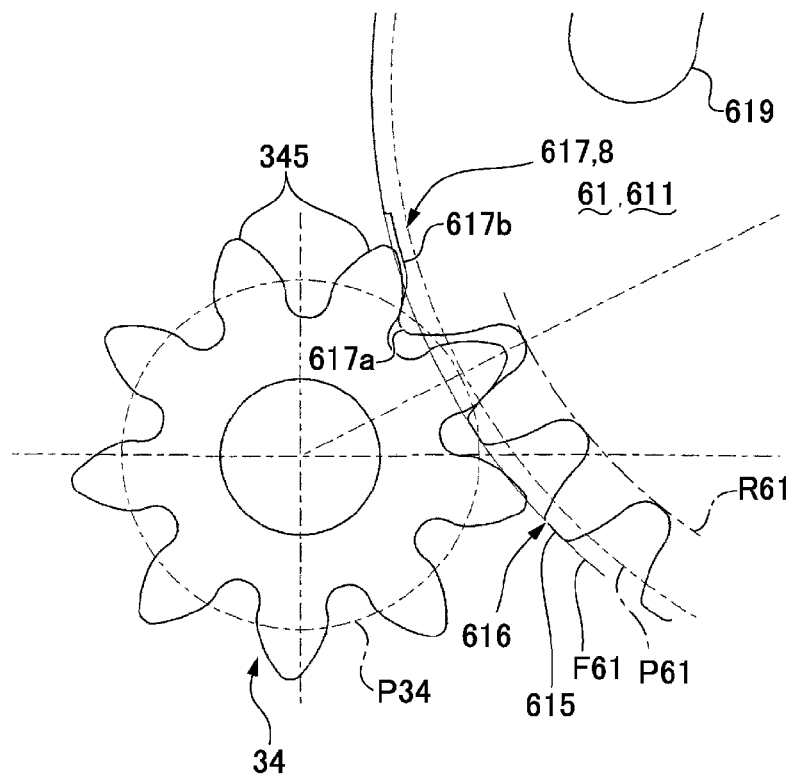
FIGS. 6(a) and 6(b) are explanatory views showing a stopper mechanism which is structured between a motor pinion and a gear in a geared motor in accordance with an embodiment of the present invention.
Figure 6B:
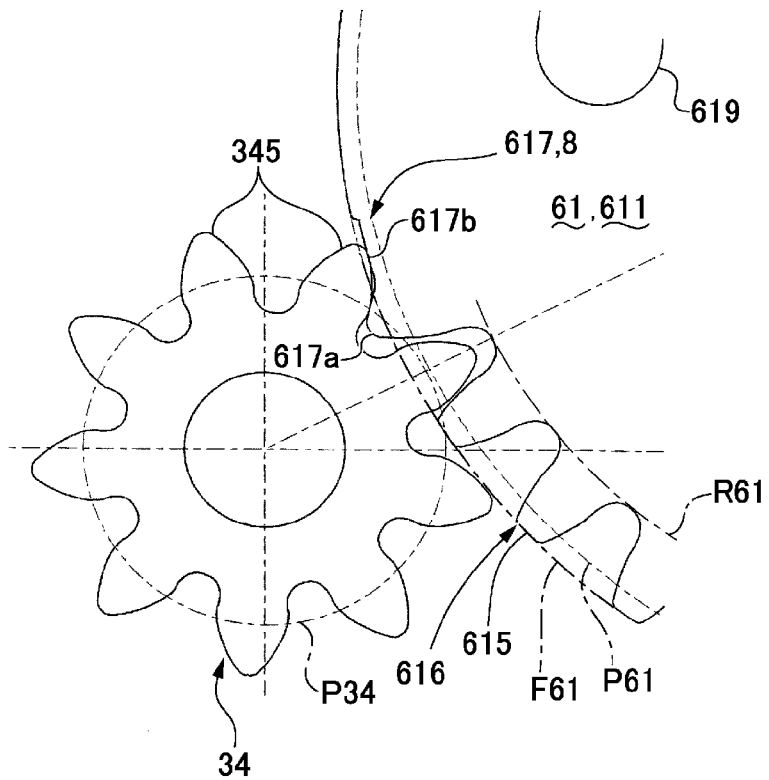

FIGS. 5(a) and 5(b) are explanatory views showing an engaging portion of the motor pinion 34 with the gear 61 in the geared motor 1 in accordance with an embodiment of the present invention. FIG. 5(a) is a plan view showing an engaging portion of the motor pinion 34 with the gear 61 and FIG. 5(b) is an enlarged plan view showing the engaging portion. FIGS. 6(a) and 6(b) are explanatory views showing a stopper mechanism which is structured between the motor pinion 34 and the gear 61 in the geared motor 1 in accordance with an embodiment of the present invention. FIG. 6(a) is a plan view showing a state just before that rotation of the motor pinion 34 is stopped by a stopper mechanism and FIG. 6(b) is a plan view showing a state that rotation of the motor pinion 34 is just stopped by the stopper mechanism.

In FIGS. 5(a) and 5(b), the motor pinion 34 (first gear) is formed with tooth parts 345 over the entire periphery and the number of teeth is nine in this embodiment. The motor pinion 34 is engaged with the large diameter gear part 611 of the gear 61. The large diameter gear part 611 of the gear 61 is formed with a stopper part 8 which is capable of engaging with a tooth part 345 of the motor pinion 34 to stop and prevent rotation of the motor pinion 34. More specifically, an outer peripheral part of the large diameter gear part 611 of the gear 61 is formed with a teeth formation part 616 where tooth parts 615 are formed and a teeth non-formation part 617 where a tooth part 615 is not formed. Both ends in a circumferential direction of the teeth non-formation part 617 functions as the stopper part 8.

In this embodiment, at both ends in a circumferential direction of the teeth non-formation part 617, i.e., in each of two boundary portions between the teeth formation part 616 and the teeth non-formation part 617, the teeth non-formation part 617 is formed with a protruded part 617a as a stopper, which is protruded to an outer side in a radial direction with respect to the tooth tip circle "F61" of the tooth parts 615 of the gear 61, and a recessed part 617b which is recessed to an inner side in the radial direction with respect to the protruded part 617a on a teeth non-formation part 617 side so as to be adjacent to the protruded part 617a as a stopper on an opposite side to the teeth formation part 616 in the circumferential direction. The protruded part 617a and the recessed part 617b are connected with each other in the circumferential direction to structure the stopper part 8.

In this embodiment, the recessed part 617b is recessed to an inner side in the radial direction with respect to the tooth tip circle "F61" of the gear 61. However, the recessed part 617b is located on an outer side in the radial direction with respect to the pitch circle "P61" of the gear 61. The pitch circle "P61" of the gear 61 is located between the tooth root circle "R61" and the tooth tip circle "F61" and thus the recessed part 617b is located on an outer side in the radial direction with respect to the middle of the tooth root circle "R61" and the tooth tip circle "F61". In other words, the recessed part 617b is located on an outer side in the radial direction with respect to an imaginary circle having a diameter between a diameter of the tooth root circle "R61" and a diameter of the tooth tip circle "F61" and is concentric with the tooth root circle "R61" and the tooth tip circle "F61". In this embodiment, the recessed part 617b is structured as a peripheral face (circular arc face) having a peripheral length substantially equal to a length of one tooth part 615. Further, a portion of the teeth non-formation part 617 which is interposed in the circumferential direction between two recessed parts 617*b* is formed in a peripheral face (circular arc face) which is extended in the circumferential direction on a concentric imaginary circle having the same diameter as the tooth tip circle "F61".

In the gear mechanism 6 structured as described above, when the motor pinion 34 is rotated and the tooth part 345 of the motor pinion 34 is reached to an end part of the teeth formation part 616 as shown in FIG. 6(*a*), the tooth part 345 of the motor pinion 34 is abutted with the protruded part 617*a* of the gear 61 and, immediately after that time, as shown in FIG. 6(*b*), the tooth part 345 of the motor pinion 34 is abutted with the recessed part 617*b*. As a result, rotation of the motor pinion 34 is stopped. At the time of the stopping operation, as shown in FIG. 6(*a*), when the tooth part 345 of the motor pinion 34 is abutted with the protruded part 617*a* of the gear 61, a portion of the tooth part 345 corresponding to the pitch circle "P34" on the root part side of the tooth part 345 is abutted with the protruded part 617*a* of the gear 61. In this case, a side face of the protruded part 617*a* of the gear 61 is inclined and thus a pressure angle is large when the portion of the tooth part 345 corresponding to the pitch circle "P34" is abutted with the protruded part 617*a*. For example, the pressure angle is not less than 50°. Therefore, the motor pinion 34 is braked. Further, as shown in FIG. 6(*b*), when a tip end side of the tooth part 345 of the motor pinion 34 is to be abutted with the recessed part 617*b*, a portion which is near to the root part side from the tip end side of the tooth part 345 is abutted with the recessed part 617*b* of the gear 61. Therefore, a load when the motor pinion 34 is stopped is shared with an abutting portion of a portion of the tooth part 345 corresponding to the pitch circle "P34" with the protruded part 617*a* and an abutting portion of the tip end side of the tooth part 345 with the recessed part 617*b* of the gear 61. In this case, when the recessed part 617*b* of the gear 61 is formed so that a shape of the recessed part 617*b* of the gear 61 is formed in a shape so as to be surface-contacted with the tip end side of the tooth part 345, an abutting area of the tip end side of the tooth part 345 with the recessed part 617*b* of the gear 61 is increased and thus the tooth part 345 is surely prevented from occurring damage such as breaking, deformation, a crack or the like.

As described above, in the gear mechanism 6 and the geared motor 1 in this embodiment, in order to structure the stopper mechanism which utilizes engagement of the motor pinion 34 (first gear) and the gear 61 (second gear), the gear 61 is formed with the stopper part 8 as the teeth non-formation part 617 where the tooth parts 615 are not formed and the teeth non-formation part 617 (stopper part 8) is formed with the protruded part 617*a* which is protruded to an outer side in the radial direction with respect to the tooth tip circle "F61" of the gear 61 and the recessed part 617*b* which is recessed to an inner side in the radial direction with respect to the protruded part 617*a* at a position adjacent to the protruded part 617*a* in the circumferential direction. Therefore, when the tooth part 345 of the motor pinion 34 is abutted with the recessed part 617*b* of the teeth non-formation part 617, the protruded part 617*a* is also abutted with the vicinity of the pitch circle "P34" of the tooth part 345 of the motor pinion 34. Accordingly, even when rotation of the motor pinion 34 is stopped by the teeth non-formation part 617 (stopper part 8) provided in the gear 61, a turning force of the motor pinion 34 does not concentrate on the tooth tip part of the tooth part 345 and thus damage such as breaking, deformation, a crack and the like is hard to be occurred in the tooth part 345.

Further, the recessed part 617*b* is recessed to an inner side in the radial direction with respect to the tooth tip circle "F61" of the gear 61. Therefore, the protruded part 617*a* is surely abutted with the vicinity of the pitch circle "P34" of the tooth part 345 of the motor pinion 34 before the tooth part 345 of the motor pinion 34 is abutted with the recessed part 617*b*. In other words, the recessed part 617*b* is formed to be recessed to an inner side in the radial direction with respect to the tooth tip circle "F61" of the gear 61 so that the protruded part 617*a* is abutted with the vicinity of the pitch circle "P34" of the tooth part 345 of the motor pinion 34 before the tooth part 345 of the motor pinion 34 is abutted with the recessed part 617*b*. Therefore, when rotation of the motor pinion 34 is stopped by the teeth non-formation part 617 provided in the gear 61, a turning force of the motor pinion 34 is surely prevented from being concentrated on the tooth tip part of the tooth part 345 and thus damage of the tooth part 345 is further hard to be occurred.

In addition, the recessed part 617*b* is located on an outer side in the radial direction with respect to the pitch circle "P61" of the gear 61. In other words, the recessed part 617*b* is located on an outer side in the radial direction with respect to an imaginary circle having a middle diameter between the diameter of the tooth root circle "R61" and the diameter of the tooth tip circle "F61" of the gear 61 and is concentric with the tooth root circle "R61" and the tooth tip circle "F61". Therefore, a state is prevented in which tooth parts 345 adjacent to each other in the circumferential direction of the motor pinion 34 engage and bite the protruded part 617*a* from both sides to be in an unmoving state.

Further, in this embodiment, the first gear which structures the stopper mechanism is the motor pinion 34 provided in the rotation shaft 35 of the motor 2 and the second gear is the gear 61 (input gear) engaged with the motor pinion 34. Therefore, the stopper mechanism (stopper part 8) is provided in a portion where a torque is relatively small and thus a load applied to the tooth part 345 is small. Accordingly, damage of the tooth part 345 is hard to be occurred.

(Structure of Output Member 640)

Figure 7:
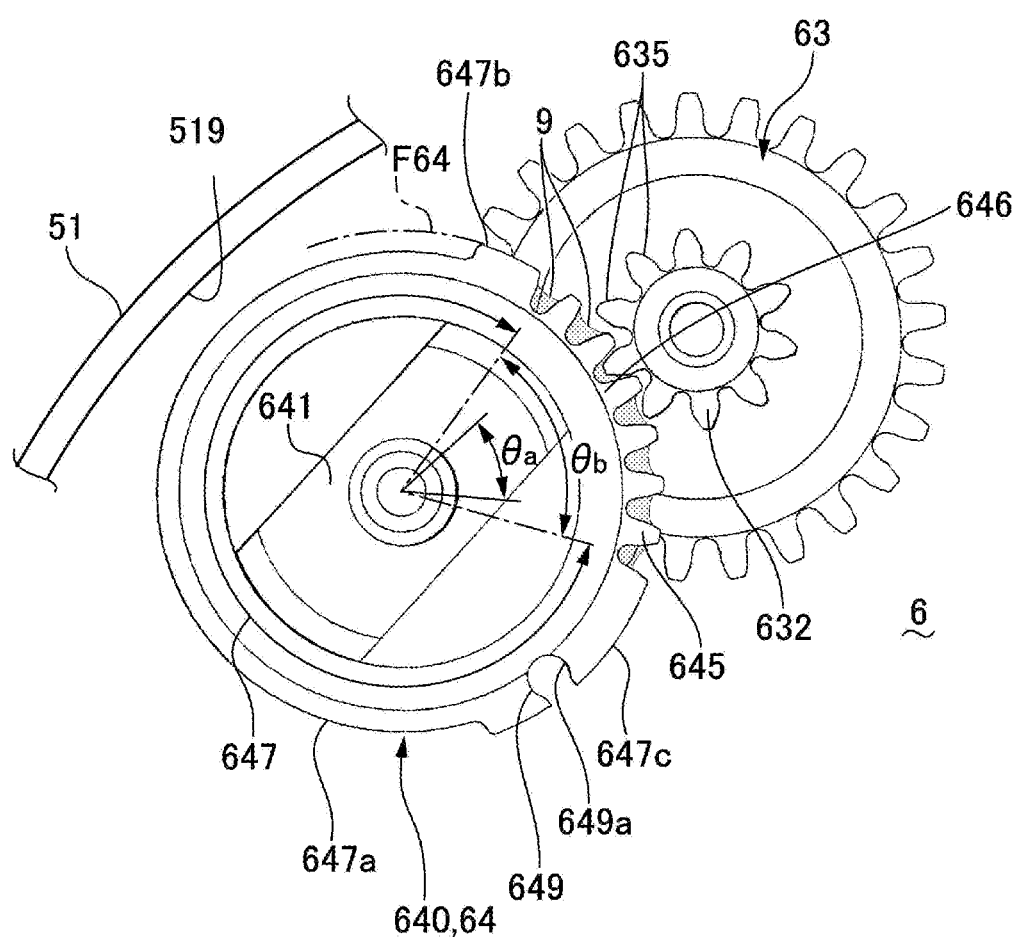
FIG. 7 is a plan view showing an engaging portion of an output member with a gear in a geared motor in accordance with an embodiment of the present invention.

FIG. 7 is a plan view showing an engaging portion of the output member 640 with the gear 63 in the geared motor 1 in accordance with an embodiment of the present invention.

As shown in FIG. 7, in the gear mechanism 6 of the geared motor 1 in this embodiment, a small diameter gear part 632 of the gear 63 is formed with tooth parts 635 over the entire periphery. The number of the teeth is ten in this embodiment. On the other hand, an outer peripheral part of the gear 64 (output member 640) engaged with the small diameter gear part 632 of the gear 63 is formed with a teeth formation part 646 where a plurality of tooth parts 645 is formed in a circumferential direction and a teeth non-formation part 647 where the tooth part 645 is not formed. Therefore, the teeth non-formation part 647 of the gear 64 functions as a stopper part which is engaged with the tooth part 635 of the gear 63 to prevent turning of the gear 63.

In this embodiment, the teeth non-formation part 647 is provided with a small diameter part 647*a* formed in a circumferential face (circular arc face), which is located on an inner side in the radial direction with respect to the tooth tip circle "F64" of the tooth part 645, and large diameter parts 647*b* and 647*c* having a larger diameter than the small diameter part 647*a* at positions interposed by the small diameter part 647*a* and the teeth formation part 646. The large diameter parts 647*b* and 647*c* are formed in a circumferential face (circular arc face) having the same diameter as the tooth tip circle "F64".

In the geared motor 1 which is structured as described above, the gear 64 (output member 640) is located at a nearer position than other gears 61, 62 and 63 to an inner face 519 of the case 51. However, when the output member 640 is turned according to rotation of the motor 2, the small diameter part 647*a* is set to always face the inner face 519 of the case 51. Therefore, the output member 640 can be disposed in the vicinity of the inner face 519 of the case 51. Accordingly, the size of the case 51 can be reduced, in other words, the diameters of the housing 5 and the geared motor 1 can be reduced.

In the gear mechanism 6 of the geared motor 1 structured as described above, an angular range over which the output member 640 is turned by the motor 2 is an angle (θa) determined by the stopper part 8 of the gear 61 which is described with reference to FIGS. 5(*a*) and 5(*b*) and FIGS. 6(*a*) and 6(*b*). On the other hand, an angular range of the teeth formation part 646 of the output member 640 is "θb", which is larger than the angular range "θa" over which the output member 640 is turned by the motor 2. Therefore, when the output member 640 is turned by the gear 63, the tooth part 635 of the gear 63 does not engage with the teeth non-formation part 647.

Grease is applied to the gears used in the gear mechanism 6. Therefore, grease 9 is also applied to the tooth parts 645 of the output member 640. In this embodiment, the angular range over which the output member 640 is turned by the motor 2 is "θa". However, the grease 9 is applied over the entire angular range "θb" which is wider than the angular range "θa". In other words, in this embodiment, since the angular range "θb" of the teeth formation part 646 is wider than the angular range "θa" over which the output member 640 is turned by the motor 2, the grease 9 is applied while the output member 640 is turned at the time of assembling of the geared motor 1. In this case, the output member 640 can be turned over the angular range "θb" of the teeth formation part 646 and thus the grease 9 is surely applied over the entire angular range "θa" over which the output member 640 is turned by the motor 2.

(Phase Matching of Gear 61 with Gear 64 (Output Member 640))

Figure 8A:
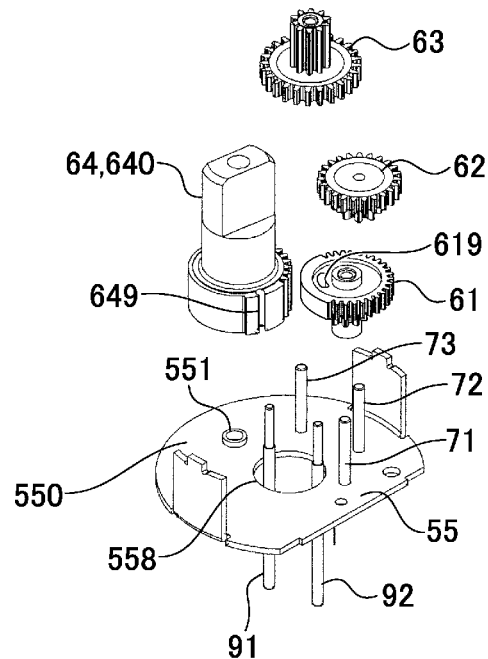
FIGS. 8(a), 8(b) and 8(c) are explanatory perspective views showing a state in which phase matching of a gear with another gear is performed when a geared motor is to be manufactured in accordance with an embodiment of the present invention.
Figure 8B:
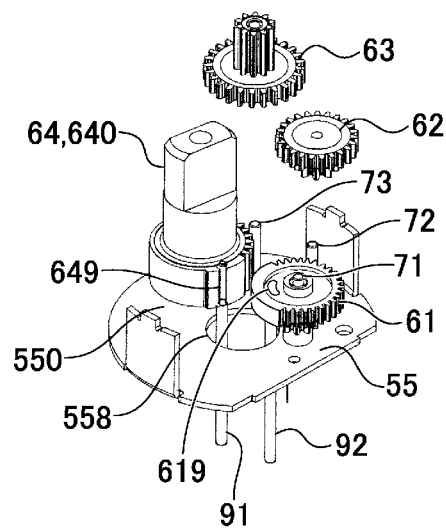
Figure 8C:
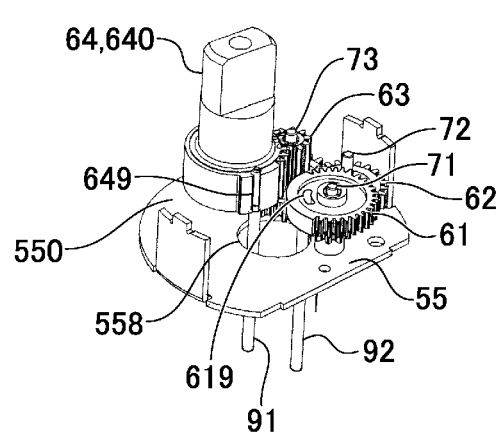

FIGS. 8(*a*), 8(*b*) and 8(*c*) are explanatory perspective views showing a state in which phase matching of the gear 61 with the gear 64 is performed when the geared motor 1 is to be manufactured in accordance with an embodiment of the present invention.

As described with reference to FIGS. 5(*a*) and 5(*b*) and FIGS. 6(*a*) and 6(*b*), the stopper part 8 is structured in the gear 61 and the angular range over which the gear 64 (output member 640/output gear) is turned is set by "θa" by the stopper part 8. Further, a driven member is connected with the output shaft 641 of the output member 640 in a predetermined direction. Therefore, a phase of the gear 61 with the gear 64 (output member 640) is required to be matched. However, the gear 61 is an input gear to which rotation of the motor 2 is firstly inputted and the gear 61 is a preceding gear (gear in the preceding stage) connected with the gear 64 (output member 640) through the gears 62 and 63. In other words, the gear 61 and the gear 64 are not engaged with each other directly.

Therefore, in this embodiment, as shown in FIG. 7 and the like, the gear 64 is formed with a first hole 649 (positioning part) showing an angular position of the gear 64. In this embodiment, the first hole 649 is formed by utilizing the teeth non-formation part 647 of the gear 64. More specifically, the first hole 649 is formed in the large diameter part 647*c* of the teeth non-formation part 647 whose peripheral length is longer than the large diameter part 647*b*. In this embodiment, the first hole 649 is formed at an outer periphery of the large diameter part 647*c* so that a part of the first hole 649 is opened in the radial direction but its inner peripheral contour shape is formed in a complete round shape. The first hole 649 is provided with an inner peripheral wall part 649*a* over an angular range not less than 180°. In this embodiment, the inner peripheral wall part 649*a* of the first hole 649 is formed in an angular range of substantially 200°.

On the other hand, as shown in FIGS. 5(*a*) and 5(*b*) and the like, the gear 61 is formed with a second hole 619 showing an angular position of the gear 61. In this embodiment, the second hole 619 is formed in a portion corresponding to the teeth non-formation part 617 of the large diameter gear part 611 of the gear 61. An inner peripheral contour shape of the second hole 619 is formed in an elliptic shape or an oval shape whose major axis is directed in a circumferential direction.

Therefore, when the gear mechanism 6 is to be assembled in the manufacturing step for the geared motor 1, first, as shown in FIG. 8(*a*), a first pin 91 formed in a round bar shape and a second pin 92 formed in a round bar shape are stood up on an inner side of the center hole 558 of the intermediate plate 55 in a state that the support shafts 71, 72 and 73 are attached to the intermediate plate 55 by utilizing a jig (not shown). The first pin 91 is stood up at a predetermined angular position with the turning center of the gear 64 (bearing part 551) as the center and the second pin 92 is stood up at a predetermined angular position with a turning center of the gear 61 (support shaft 71) as the center.

Next, the output member 640 and the gears 61, 62 and 63 are attached. When the output member 640 is to be attached to the bearing part 551, as shown in FIG. 8(*b*), a position where the first hole 649 is fitted to the first pin 91 is set to be an assembling angular position of the output member 640. Further, when the gear 61 is to be fitted to the support shaft 71, a position where the second hole 619 is fitted to the second pin 92 is set to be an assembling angular position of the gear 61.

After that, as shown in FIG. 8(*c*), the gear 63 is meshed with the output member 640. Further, the gear 62 is meshed with the gear 63. In this case, when the gear 62 is to be meshed with the gear 61, the second hole 619 is formed in an elliptic shape or an oval shape and thus, in a state that the second pin 92 is fitted into the second hole 619, the gear 62 and the gear 61 are meshed while an angular position of the gear 61 is finely adjusted.

When the gear mechanism 6 is assembled on the intermediate plate 55 as described above, the phase of the gear 61 with the gear 64 (output member 640) is matched.

As described above, in this embodiment, the output member 640 is formed with the first hole 649 showing the angular position of the output member 640 and the gear 61 in the preceding stage which is connected with the output member 640 through the gears 62 and 63 is formed with the second hole 619 showing the angular position of the gear 61. Therefore, after the angular positions of the output member 640 and the gear 61 in the preceding stage have been respectively determined with the first hole 649 and the second hole 619 as a reference, when the gears 62 and 63 are assembled between the output member 640 and the gear 61 in the preceding stage, the gears 62 and 63 are assembled in a state that the phase of the output member 640 with the gear 61 in the preceding stage is adjusted. Therefore, the phase can be adjusted between the gears which are not directly engaged with each other. Further, different from a case that the phase is matched by utilizing the teeth non-formation part, a meshing ratio is not lowered even when the teeth number is small.

In this embodiment, the inner peripheral contour shape of the first hole 649 is a complete round shape and the inner peripheral contour shape of the second hole 619 is an elliptic shape or an oval shape whose major axis is directed in the circumferential direction. Therefore, the angular position of the output member 640 can be adjusted with a high degree of accuracy and a clearance of meshing can be adjusted by the gear 61 in the preceding stage.

Further, the inner peripheral wall part 649a of the first hole 649 is formed over an angular range of 180° or more and thus, the first pin 91 is prevented from being inclined after the first pin 91 is fitted to the first hole 649 until the assembling is completed.

Further, as described with reference to FIG. 7 and the like, the output member 640 is formed with the teeth formation part 646 where a plurality of tooth parts 645 is formed in the circumferential direction and the teeth non-formation part 647 where the tooth part 645 is not formed, and the teeth non-formation part 647 functions as a stopper part. Therefore, after the gear mechanism 6 has been assembled, even when the first pin 91 is detached, the output member 640 is prevented from being turned excessively. Further, in this embodiment, the first hole 649 as a positioning part for the gear 64 is formed in the teeth non-formation part 647 and thus, in comparison with a case that the first hole 649 is formed in the teeth formation part 646, the first hole 649 (positioning part) is formed easily.

[Other Embodiments]

In the embodiment described above, the stopper part 8 is formed in the input gear (gear 61). However, the stopper part 8 may be formed in other gears 62 and 63 or the like.

In the embodiment described above, the stopper part 8 is provided in the gear mechanism 6 of the geared motor 1 in which the motor 2 is used as a drive source. However, the present invention may be applied to a case in which the stopper part 8 is provided in the gear mechanism 6 of a device other than the geared motor 1 in which the motor 2 is used as a drive source.

In the embodiment described above, the stopper part 8 is formed with the protruded parts 617a provided at two positions separated from each other in the circumferential direction and the recessed part 617b is formed for each of two protruded parts 617a. However, the recessed parts 617b may be formed as one continuous recessed part 617b between two protruded parts 617a.

In the embodiment described above, the first hole 649 and the second hole 619 are utilized to adjust angular positions of the gear 61 (gear in the preceding stage) and the gear 64 (output gear). However, the first hole 649 and the second hole may be utilized to adjust angular positions of the gear 64 (output gear) and other gears 62 and 63. Further, the first hole 649 may be formed in a complete round shape so that its outer peripheral portion is not cut out and the second hole 619 may be formed in a circular shape other than an elliptic shape and an oval shape.

In the embodiment described above, three gears 61, 62 and 63 are disposed between the motor pinion 34 and the gear 64. However, the present invention may be applied to the gear mechanism 6 in which one gear or four or more gears are disposed between the motor pinion 34 and the gear 64.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A gear mechanism comprising:
   a first gear;
   a second gear which is engaged with the first gear; and
   a stopper part which is formed in the second gear, the stopper part being capable of being engaged with a tooth part of the first gear to prevent turning of the first gear;
   wherein the stopper part is a teeth non-formation part where a tooth part is not formed in an outer peripheral part of the second gear; and
   wherein the stopper part comprises:
      a protruded part which is protruded to an outer side in a radial direction with respect to a tooth tip circle of a tooth part of the second gear; and
      a recessed part which is recessed to an inner side in the radial direction with respect to the protruded part at a position adjacent to the protruded part in a circumferential direction and, when turning of the first gear is stopped, a tip end side of the tooth part of the first gear is abutted with the recessed part.

2. The gear mechanism according to claim 1, wherein the recessed part is recessed to an inner side in the radial direction with respect to the tooth tip circle of the second gear.

3. The gear mechanism according to claim 2, wherein the recessed part is located on an outer side in the radial direction with respect to a pitch circle of the second gear.

4. The gear mechanism according to claim 2, wherein the recessed part is located on an outer side in the radial direction with respect to an imaginary circle having a diameter between a diameter of a tooth root circle of the second gear and a diameter of the tooth tip circle of the second gear and the imaginary circle is concentric with the tooth root circle of the second gear and the tooth tip circle of the second gear.

5. The gear mechanism according to claim 1, wherein
   the second gear is provided with a large diameter gear part and a small diameter gear part,
   an outer peripheral part of the large diameter gear part is formed with a teeth formation part where tooth parts are formed and the teeth non-formation part, and
   the stopper part is formed at both ends of the teeth non-formation part in a circumferential direction.

6. The gear mechanism according to claim 1, wherein when turning of the first gear is stopped by the stopper part, the turning of the first gear is stopped by abutting a tooth part of the first gear with both of the protruded part and the recessed part.

7. The gear mechanism according to claim 6, wherein
   the recessed part is formed with a shape which is capable of face-contacting with a tip end side of the tooth part of the first gear, and
   when turning of the first gear is stopped by the stopper part, a root part side of the tooth part of the first gear is stopped by the protruded part and the tip end side of the tooth part of the first gear is stopped by being face-contacted with the recessed part.

8. A geared motor comprising a gear mechanism through which rotation of a motor is decelerated and transmitted,
   wherein the gear mechanism comprises:
      a first gear;
      a second gear which is engaged with the first gear; and
      a stopper part which is formed in the second gear, the stopper part being capable of being engaged with a tooth part of the first gear to prevent turning of the first gear;
   wherein the stopper part is a teeth non-formation part where a tooth part is not formed in an outer peripheral part of the second gear; and wherein the stopper part comprises:
- a protruded part which is protruded to an outer side in a radial direction with respect to a tooth tip circle of a tooth part of the second gear; and
- a recessed part which is recessed to an inner side in the radial direction with respect to the protruded part at a position adjacent to the protruded part in a circumferential direction and, when turning of the first gear is stopped, a tip end side of the tooth part of the first gear is abutted with the recessed part; and wherein the first gear is a motor pinion provided in a rotation shaft of the motor and the second gear is an input gear which is engaged with the motor pinion.

9. The geared motor according to claim 8, wherein the recessed part is recessed to an inner side in the radial direction with respect to the tooth tip circle of the input gear.

10. The geared motor according to claim 9, wherein the recessed part is located on an outer side in the radial direction with respect to a pitch circle of the input gear.

11. The geared motor according to claim 9, wherein the recessed part is located on an outer side in the radial direction with respect to an imaginary circle having a diameter between a diameter of a tooth root circle of the input gear and a diameter of the tooth tip circle of the input gear and the imaginary circle is concentric with the tooth root circle of the input gear and the tooth tip circle of the input gear.

12. The geared motor according to claim 8, wherein
the input gear is provided with a large diameter gear part and a small diameter gear part,
an outer peripheral part of the large diameter gear part is formed with a teeth formation part where tooth parts are formed and the teeth non-formation part, and
the stopper part is formed at both ends of the teeth non-formation part in a circumferential direction.

13. The geared motor according to claim 8, wherein when turning of the motor pinion is stopped by the stopper part, the turning of the motor pinion is stopped by abutting a tooth part of the motor pinion with both of the protruded part and the recessed part.

14. The geared motor according to claim 13, wherein
the recessed part is formed with a shape which is capable of face-contacting with a tip end side of the tooth part of the first gear, and
when turning of the motor pinion is stopped by the stopper part, a root part side of the tooth part of the motor pinion is stopped by the protruded part and the tip end side of the tooth part of the motor pinion is stopped by being face-contacted with the recessed part.

15. A gear mechanism comprising:
a first gear;
a second gear which is engaged with the first gear; and
a stopper part which is formed in the second gear, the stopper part being capable of being engaged with a tooth part of the first gear to prevent turning of the first gear;
wherein the stopper part comprises:
- a protruded part which is protruded to an outer side in a radial direction with respect to a tooth tip circle of a tooth part of the second gear; and
- a recessed part which is recessed to an inner side in the radial direction with respect to the protruded part at a position adjacent to the protruded part in a circumferential direction.

* * * * *